US007818292B2

(12) United States Patent
Nori et al.

(10) Patent No.: US 7,818,292 B2
(45) Date of Patent: Oct. 19, 2010

(54) SQL CHANGE TRACKING LAYER

(76) Inventors: Anil Kumar Nori, 7421 204th Dr., NE., Redmond, WA (US) 98053; Laxmi Narsimha Rao Orugant, 1-7-20, P.S.R. Centre, Suryapet, Nalgonda (Dist) (IN) 508213; Subramanian Muralidhar, 1620 W. Lake Sammamish Pkwy., NE., Bellevue, WA (US) 98008; Ambrish Mishra, Flat No 401, Surya Sravanthi, Plot 144, Jubilee Gardens, Near Harsha Toyota, Hyderabad (IN) 500048; Lev Novik, 14116 SE. 45th St., Bellevue, WA (US) 98006; Manikandan Thangarathnam, Plot No 494, 10th Street, Anna Nagar West Extension, Chennai (IN) 600101; Sankara Subramanian, #1699, St. No. 20, Banjara Avenue 1, Banjara Hills, Hyderabad (IN) 500034; Sudarshan A. Chitre, 9442 225th Way NE., Redmond, WA (US) 98053; Sitaram C. V. Raju, 83, Hill Ridge Villas, Gachibowli, Hyderabad (IN) 500032; Vijay Tandra Sistla, 23987 SE. 7th La., Sammamish, WA (US) 98074

(*) Notice: Subject to any disclaimer, the term of this patent is extended or adjusted under 35 U.S.C. 154(b) by 412 days.

(21) Appl. No.: 11/697,234

(22) Filed: Apr. 5, 2007

(65) Prior Publication Data
US 2008/0250073 A1 Oct. 9, 2008

(51) Int. Cl.
*G06F 7/00* (2006.01)
*G06F 17/00* (2006.01)

(52) U.S. Cl. ............... 707/610; 707/611; 707/612; 707/613; 707/614

(58) Field of Classification Search ............... None
See application file for complete search history.

(56) References Cited

U.S. PATENT DOCUMENTS

| 7,461,005 | B2* | 12/2008 | Sachdeva ............... 705/1 |
| 2003/0212789 | A1* | 11/2003 | Hamel et al. ............ 709/225 |
| 2004/0193655 | A1* | 9/2004 | Miyata et al. ............ 707/200 |
| 2004/0193952 | A1* | 9/2004 | Narayanan et al. ........ 714/13 |
| 2004/0236746 | A1* | 11/2004 | Lomet ...................... 707/9 |
| 2005/0120183 | A1* | 6/2005 | DeSota et al. ............ 711/144 |
| 2005/0193039 | A1* | 9/2005 | Adiba et al. ............. 707/204 |
| 2006/0004733 | A1* | 1/2006 | Zoltan et al. ............ 707/3 |
| 2006/0074965 | A1* | 4/2006 | Cunningham et al. ...... 707/102 |
| 2006/0085485 | A1* | 4/2006 | Shimshoni ............... 707/200 |
| 2006/0106851 | A1* | 5/2006 | Warshawsky ............. 707/101 |
| 2006/0123059 | A1* | 6/2006 | Zamfiroiu ............... 707/200 |
| 2006/0155747 | A1* | 7/2006 | Olivieri et al. .......... 707/102 |
| 2006/0248128 | A1* | 11/2006 | Acharya et al. .......... 707/203 |
| 2007/0143363 | A1* | 6/2007 | Agarwal et al. .......... 707/203 |
| 2007/0239797 | A1* | 10/2007 | Cattell et al. ............ 707/201 |
| 2008/0189440 | A1* | 8/2008 | Goyal et al. ............. 709/248 |

* cited by examiner

*Primary Examiner*—Kuen S Lu
*Assistant Examiner*—Tuan Pham
(74) *Attorney, Agent, or Firm*—Toler Law Group, IP

(57) ABSTRACT

Systems and methods that track changes in a database via a change tracking layer that enables separation of change tracking and change enumeration. Such an arrangement enables multiple change enumeration and sync technologies over a single change tracking layer, while reducing amount of tracking information that are maintained.

19 Claims, 13 Drawing Sheets

SQL CHANGE TRACKING LAYER

BACKGROUND

Advent of a global communications network such as the Internet has facilitated exchange of enormous amounts of information. Additionally, costs associated with storage and maintenance of such information have declined, resulting in massive data storage structures. Hence, substantial amounts of data can be stored as a data warehouse, which is a database that typically represents business history of an organization. For example, the history data can be employed for analysis that supports business decisions at many levels, from strategic planning to performance evaluation of a discrete organizational unit. Such can further involve taking the data stored in a relational database and processing the data to make it a more effective tool for query and analysis Accordingly, it is important to store such data in a manageable manner that facilitates user friendly and quick data searches and retrieval. In general, a common approach is to store electronic data in one or more databases. A typical database can be referred to as an organized collection of information with data structured such that a computer program can quickly search and select desired pieces of data, for example. Commonly, data within a database is organized via one or more tables. Such tables are arranged as an array of rows and columns.

Moreover, such tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. Database applications allow the user to compare, sort, order, merge, separate and interconnect the data, so that useful information can be generated from the data. Capacity and versatility of databases have grown incredibly to allow virtually endless storage capacity utilizing databases. However, typical database systems offer limited query-ability based upon time, file extension, location, and size. For example, in order to search the vast amounts of data associated to a database, a typical search is limited to a file name, a file size, a date of creation, etc., wherein such techniques are deficient and inept.

With a continuing and increasing creation of data from end-users, the problems and difficulties surrounding finding, relating, manipulating, and storing such data is escalating. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. When obtaining such data, the data needs to be stored. In other words, the problems and difficulties surrounding finding, relating, manipulating, and storing data affect both the developer and the end user. In particular, the tracking of a data change and/or manipulation associated with such escalating amounts of data can prove to be an impossible task.

Typically, business entities create and maintain their databases through a high volume of relatively simple transactions, with an essential function of a database engine being able to execute a plurality of such transactions concurrently. Each of such plurality of transactions can be considered a piece of work, which can further consist of a sequence of operations such as, read, write, update, and/or delete, against a database. Such transaction can represent well-understood business operations (e.g., creating a new customer record, noting an account payment or transfer, and the like). Increasingly enterprises are becoming interested in running more ad hoc unstructured queries against their online data. As such, a measure of the correctness and change tracking of the state of the database or database integrity becomes increasingly vital.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation provides for tracking changes in a database via a change tracking layer that tags (e.g., marks) changes by a transaction identifier, per table synchronization (sync) bookmark, and enables separation of change tracking and change enumeration. Such an arrangement enables multiple change enumerations and sync technologies over a single change tracking layer, wherein such single tracking layer is responsible for tagging/marking changes at a row level, for example. Hence, during a single transaction, and when rows are inserted in a single table (INSERT 'N' rows—where N is an integer), typically only one entry is added to the index. Similarly during a single transaction, when rows are updated (UPDATE 'N' rows) in a single table, only one entry in index is updated/added. Accordingly, amount of tracking information that are maintained can be reduced, wherein normal system operation such as Data Manipulation Language (DML) is typically not affected.

For change tracking, the change tracking layer can employ two monotonically increasing counters, namely: a transaction begin counter (TXBSN—a monotonically increasing counter to uniquely identify a transaction begin sequence—implicit or explicit); and a transaction commit counter (TXCSN—a monotonically increasing counter to uniquely identify a transaction commit sequence—implicit or explicit). Transaction begin counter (TXBSN) can be incremented and assigned for every opening transaction. Likewise, the transaction commit counter (TXCSN) can be incremented and assigned to every committing transaction. Hence, for every transaction, the begin counter value and the commit counter value are typically assigned. Moreover, when a transaction performs an UPDATE Tracking operation, the transaction's begin counter value can be assigned, as to change counter of the row and also update index entry. Likewise, when the transaction performs an INSERT tracking operation, the subject innovation assigns a transaction's begin counter value to an insert counter of the row, and also inserts an index entry.

Also, for DELETE tracking operation, a tombstone table can be maintained, which typically includes schema such as <Table Name, Serialized row key, Delete Counter, Insert Counter of the deleted row>. Accordingly and when a row is deleted, the subject innovation serializes a row key of the row, and adds a row such as [Table Name, Serialized Row Key, Deleting transaction's begin counter value, insert counter value of deleted row], to the tombstone table. In a related aspect and to supply changes in sequence for batching, a transaction commit sequence table is supplied to map between transactions begin counter value and transaction commit counter value (e.g., when the transaction commits out of order.)

Likewise, for change enumeration and synchronization, the subject innovation can maintain bookmarks, wherein such bookmarks can point to changes that have been communicated to the sync partner tracking. The values of transaction begin counter (last sync begin counter) and transaction commit counter (last sync commit counter) can be obtained at the time of enumerating the changes and storing in a table, upon acknowledgement by the sync partner, for example. Such values can be maintained per table in a metadata table (namely _sysSyncArticles).

It is to be appreciated that the change tracking layer of the subject innovation can track the changes irrespective of the transaction type. Accordingly, sync layers can maintain the table of synchronization transactions (namely sync transaction table), to enable multiple synchronization layers over a single change tracking layer. Hence, changes made by the sync layers are separated from user transaction changes. For INSERT enumeration operation all rows from user table can be obtained that pertain to: 1) a local user transaction insert (e.g., not an INSERT received from sync partner; such as when insert counter of the row is not in sync transaction table); and 2) wherein such INSERT is not already communicated to the sync partner (e.g., Insert counter of the row has more value than the last sent bookmark).

Likewise, for an UPDATE Enumeration, all rows from user table can be obtained that pertain to: 1) a local user change (e.g., not an UPDATE received from sync partner; such as when the change counter of the row is not in the sync transaction table); and 2) wherein such UPDATE is not already communicated to the sync partner (e.g., change counter of the row has more value than the last sent bookmark); and 3) that such UPDATE Enumeration is not an INSERT+UPDATE (e.g., insert counter of the row is more than last sent bookmark).

Similarly, for a DELETE enumeration all rows from user table can be obtained that pertain to: 1) a local user DELETE (e.g., not a DELETE received from sync partner; such as when DELETE counter of the row is not in sync transaction table); and 2) wherein such DELETE is not already communicated to the sync partner (e.g., Delete counter of the row has more value than the last sent bookmark); and 3) that such DELETE Enumeration is not an INSERT+DELETE (e.g., insert counter of the row is more than last sent bookmark).

According to a further aspect of the subject innovation, an index can be handled only once per table per transaction. For example, if 'N' rows (where N is an integer) are inserted in a single table during a single transaction, only one entry to index can be added. Likewise, if 'N' rows are updated in a single table during a single transaction, only one entry in index is updated/added.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
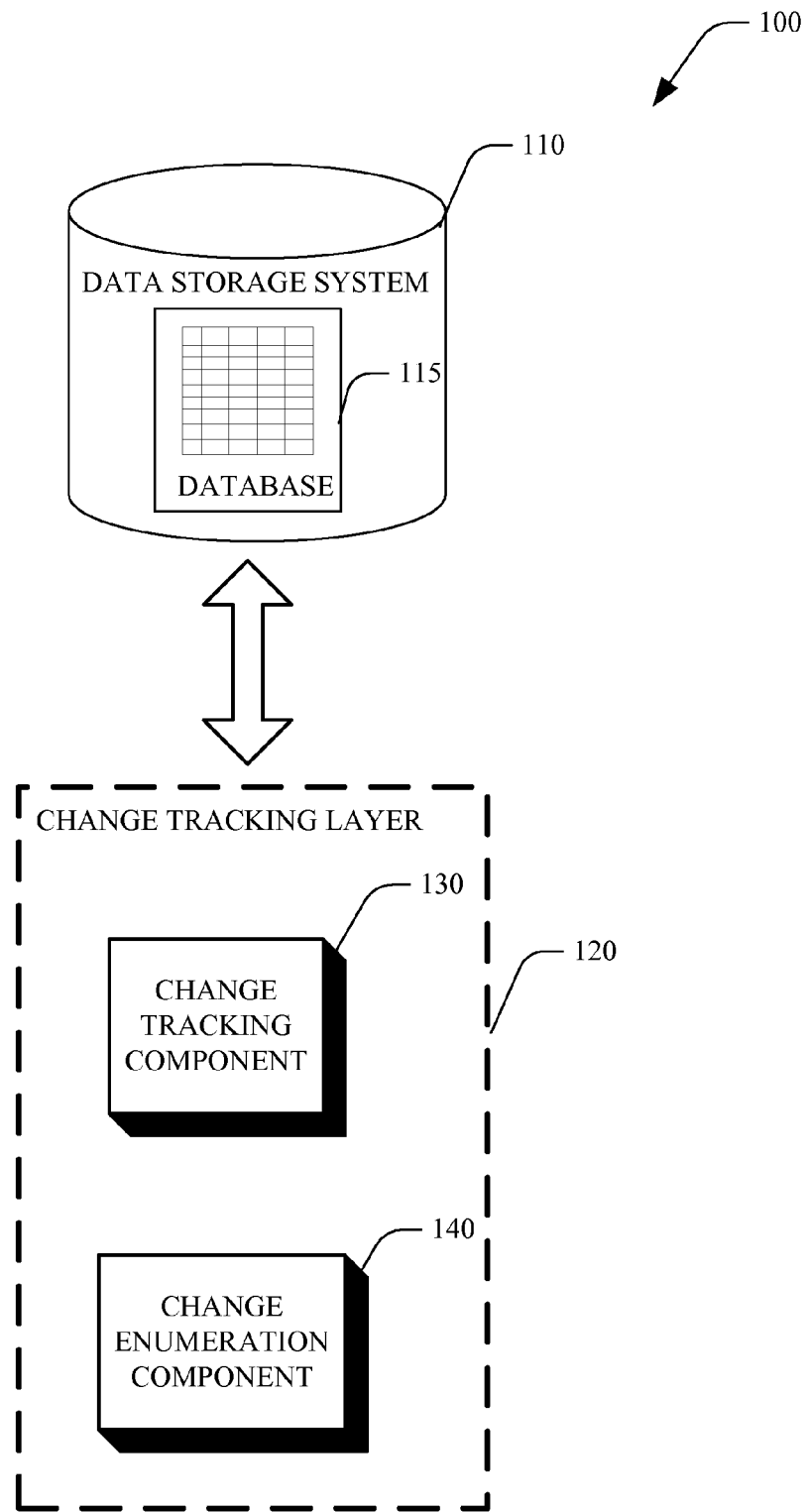
FIG. 1 illustrates a block diagram of an exemplary system for tracking data changes in a data storage system in accordance with an aspect of the subject innovation.

FIG. 1 illustrates a system 100 that facilitates tracking data changes in a data storage system 110 that includes a database 115. The change tracking layer 120 provides for tracking changes in the database 115, wherein a transaction identifier can tag changes per table sync bookmark. Moreover, the change tracking layer 120 enables separation of change tracking and change enumeration, via the change tracking component 130 and change enumeration component 140, as described in detail infra. Moreover, such an arrangement enables multiple change enumeration and sync technologies over the single change tracking layer 120, which is responsible for tagging marking changes at a row level, for example.

The data storage system 110 can be a complex model based at least upon a database structure, wherein an item, a sub-item, a property, and a relationship are defined to allow representation of information within a data storage system as instances of complex types. For example, the data storage system 110 can employ a set of basic building blocks for creating and managing rich, persisted objects and links between objects. An item can be defined as the smallest unit of consistency within the data storage system 110, which can be independently secured, serialized, synchronized, copied, backup/restored, and the like. Such item can include an instance of a type, wherein all items in the data storage system 110 can be stored in a single global extent of items. The data storage system 110 can be based upon at least one item and/or a container structure. Moreover, the data storage system 110 can be a storage platform exposing rich metadata that is buried in files as items. The data storage system 110 can include the database 115, to support the above discussed functionality, wherein any suitable characteristics and/or attributes can be implemented. Furthermore, the data storage system 110 can employ a container hierarchical structure, wherein a container is an item that can contain at least one other item. The containment concept is implemented via a container ID property inside the associated class. A store can also be a container such that the store can be a physical organizational and manageability unit. In addition, the store represents a root container for a tree of containers within the hierarchical structure.

The change tracking layer 120 can track at least one data change (e.g., a copy, an update, a replace, a get, a set, a create, a delete, a move, and a modify) within the data storage system 110, wherein such data change can be associated with an entity and sub-entity level for any and/or all entities stored within the database 115. Moreover, the change tracking layer 120 can capture the data change(s) to entities that facilitate synchronizing data between two systems maintaining substantially similar sets of data, for example.

The change tracking layer 120 can further employ a schema that provides an infrastructure, to enable a store and/or container and provide granular maintenance in relation to a data change. By invoking such schema, the change tracking layer 120 can provide an efficient mechanism to capture and maintain data changes within the data storage system 110. Put differently, the change tracking layer 120 can identify data that is marked for synchronization and avoids expensive data change tracking for other entities. It is to be appreciated that the change tracking layer 120 can provide granular tracking on at least one data change associated with the database 115, wherein the granular tracking can be on an entity, a sub-entity, a sub-sub-entity, and the like.

As explained earlier, an item, extension, and/or link can be considered an entity within the data storage system 110. If such entity does not participate in a synchronization relationship (also referred to as a "sync relationship"), the maintenance of certain data changes can be postponed until such entity begins participation in synchronization (also referred to as "sync"). For instance, the schema can be designed that carefully segments the data capture for a generic data change tracking from the data captured for the exclusive use of synchronization infrastructure. The schema can capture data changes at an entity level as well as sub-entity levels to facilitate the synchronization of minimal amount of data that was affected.

Figure 2:
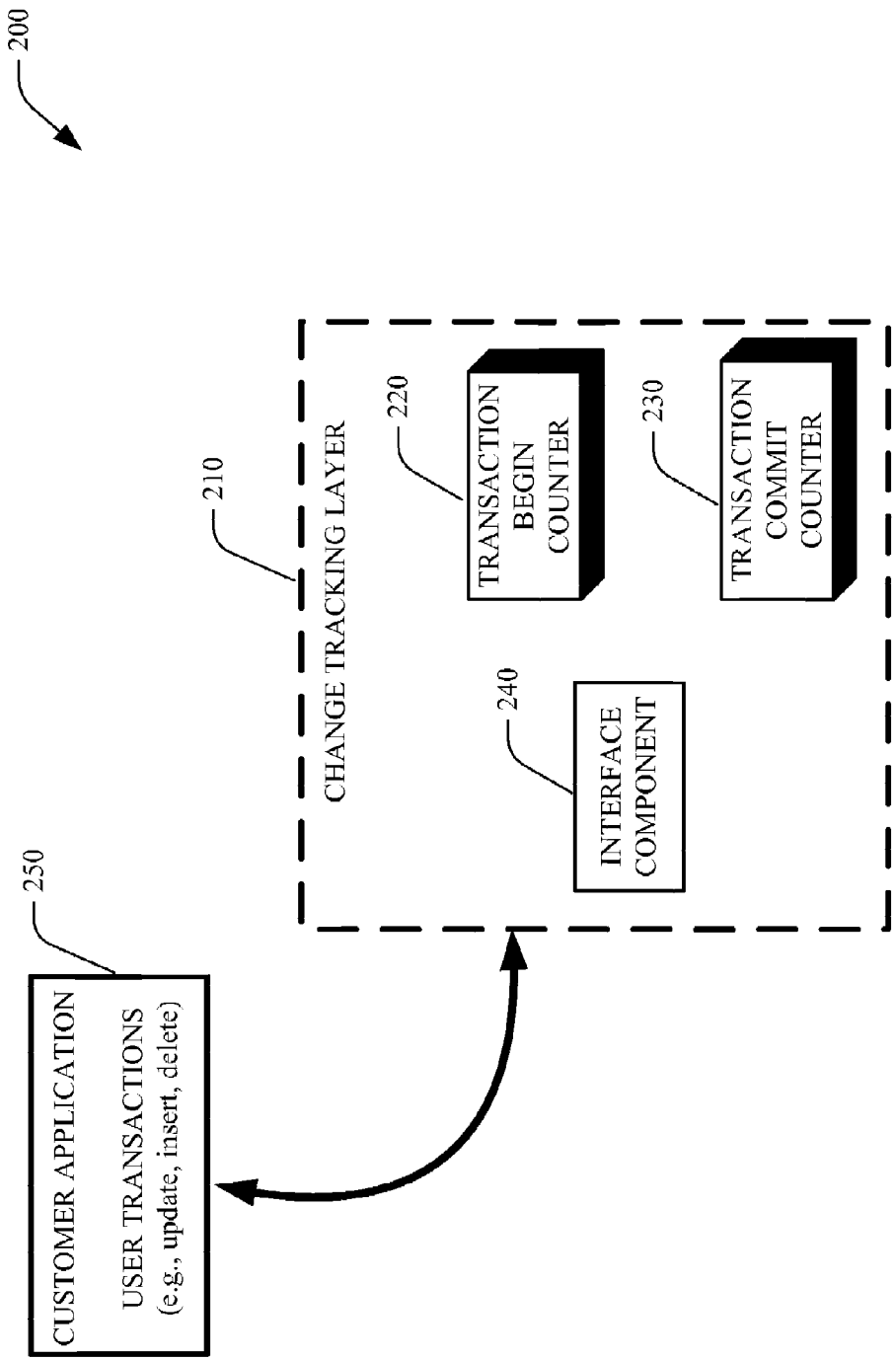
FIG. 2 illustrates a system with a change tracking layer that interacts with a customer application, to supply change tracking associated therewith.

FIG. 2 illustrates a system 200 with a change tracking layer 210 that interacts with a customer application 250, to supply change tracking associated therewith. The change tracking layer 210 can employ two monotonically increasing counters namely transaction begin counter (TXBSN) 220 and transaction commit counter (TXCSN) 230. The Transaction begin counter (TXBSN) 220 is a monotonically increasing counter that uniquely identifies a transaction—implicit or explicit—begin sequence, wherein it can be incremented and assigned for every opening transaction. Likewise, the transaction commit counter (TXCSN) 230 is a monotonically increasing counter to uniquely identify a transaction—implicit or explicit commit sequence. Such transaction commit counter (TXCSN) 230 can be incremented and assigned to every committing transaction. Hence, for every transaction a begin counter value and commit counter value is typically assigned. For example, when a transaction performs an UPDATE Tracking operation, the transaction's begin counter value can be assigned to change counter of the row and also an update index entry. Likewise, when the transaction performs an INSERT tracking operation, the subject innovation assigns a transaction's begin counter value to insert counter of the row and also inserts an index entry.

The system change tracking layer 210 can further include an interface component 240, which provides various adapters, connectors, channels, communication paths, and the like, to integrate the change tracking layer into virtually any operating and/or database system(s). In addition, the interface component 240 can provide various adapters, connectors, channels, communication paths, etc. that provide for interaction with the data storage system associated with the customer application 250. It is to be appreciated that although the interface component 240 is incorporated as part of the change tracking layer 210, such implementation is not so limited. For instance, the interface component 240 can be a stand-alone component to receive or transmit data in relation to the system 200.

Figure 3:
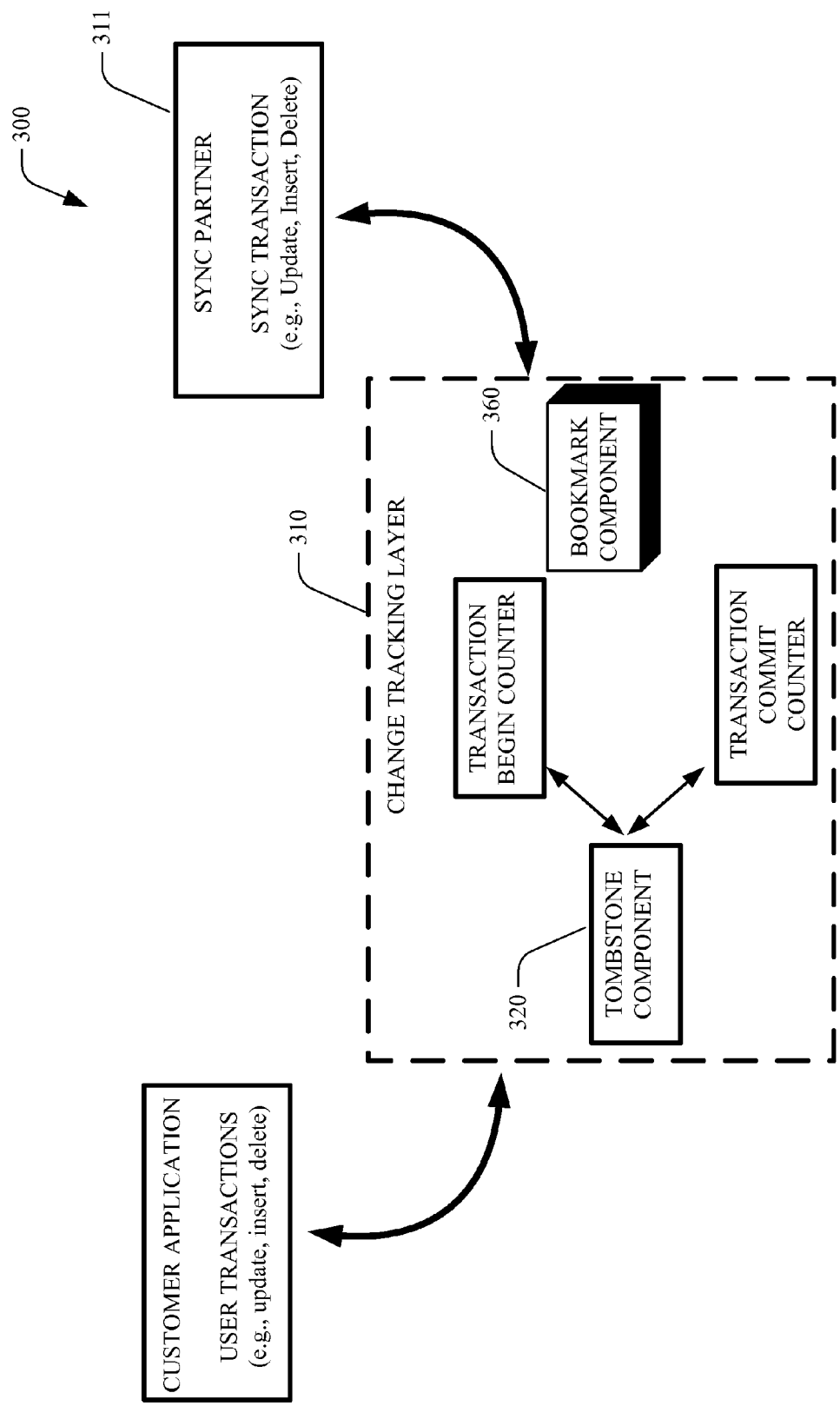
FIG. 3 illustrates a block diagram for a change tracking layer of the subject innovation.

Likewise for DELETE tracking operation, and as illustrated in FIG. 3, a tombstone table can be maintained by the tombstone component 320, which typically includes schema such as <Table Name, Serialized row key, Delete Counter, Insert Counter of the deleted row>.

A tombstone component 320 can store tombstones in a separate tombstone table, resurrect a tombstone, and/or provide tombstone cleanup. In one example, Item delete can create one tombstone for the item being deleted, wherein the tombstone table typically includes schema such as <Table Name, Serialized row key, Delete Counter, Insert Counter of the deleted row>. For example, a single tombstone table can be maintained for the whole database to track DELETES, wherein the Tombstone table typically maintains the row identification information of each row that got deleted (and not the whole row.) Moreover, an implementation can chose to operate in conjunction with a model of one tombstone per table, in case full row is required—as opposed to a primary key (or a row key).

Accordingly and when a row is deleted, the subject innovation serializes the row key of the row, and adds a row such as [Table Name, Serialized Row Key, Deleting transaction's begin counter value, insert counter value of deleted row] to the tombstone table maintained by the tombstone component 320. Moreover, to supply changes in sequence for batching, a transaction commit sequence table (not shown) can be supplied to map between transactions begin counter value and transaction commit counter value (e.g., when the transaction commits out of order.)

As further illustrated in FIG. 3, the change tracking layer 310 can interact with a sync partner 311 via the bookmark component 360. The bookmark component 360 can identify and point to changes that have been communicated to a sync partner 311 tracking. The values of transaction begin counter (last sync begin counter) and transaction commit counter (last sync commit counter) can be obtained at the time of enumerating the changes and storing in a table, upon acknowledgement by the sync partner. Such values can be maintained per table in a metadata table (namely _sysSyncArticles).

It is to be appreciated that the change tracking layer 310 can track the changes irrespective of the transaction type. Accordingly, sync layers maintain the table of synchronization transactions (namely sync transaction table), to enable multiple synchronization layers over a single change tracking layer. Hence, the changes made by the sync layers are separated from user transaction changes. For INSERT enumeration operation all rows from user table can be obtained that pertain to: 1) a local user transaction insert (e.g., not an INSERT received from sync partner 311; such as when insert counter of the row is not in sync transaction table); and 2) wherein such INSERT is not already communicated to the sync partner (e.g., Insert counter of the row has more value than the last sent bookmark).

Likewise, for an UPDATE Enumeration, all rows from user table can be obtained that pertain to: 1) a local user change (e.g., not an UPDATE received from sync partner; such as when the change counter of the row is not in the sync transaction table); and 2) wherein such UPDATE is not already communicated to the sync partner (e.g., change counter of the row has more value than the last sent bookmark); and 3) that such UPDATE Enumeration is not an INSERT+UPDATE (e.g., insert counter of the row is more than last sent bookmark).

An example for an UPDATE Enumeration can include:

```
SELECT ut.* FROM
    (select ut0.* from <User Table> as ut0 where
    (ut0._sysInsertTxBsn is null or ut0._sysInsertTxBsn < LBSN)
    and - Filter INSERTS
    ut0._sysChangeTxBsn >= LBSN and ut0._sysChangeTxBsn <
    EBSN) AS ut
LEFT OUTER JOIN
    (select txcs0.* from _sysTxCommitSequence as txcs0 where
    txcs0._sysTxCsn >= LCSN and txcs0._sysTxCsn < ECSN)
    AS txcs
    ON ut._sysChangeTxBsn = txcs._sysTxBsn OR
    txcs._sysTxBsn IS NULL;
```

Similarly, for a DELETE enumeration all rows from user table can be obtained that pertain to: 1) a local user DELETE (e.g., not a DELETE received from sync partner; such as when DELETE counter of the row is not in sync transaction table); and 2) wherein such DELETE is not already communicated to the sync partner (e.g., Delete counter of the row has more value than the last sent bookmark); and 3) that such DELETE Enumeration is not an INSERT+DELETE (e.g., insert counter of the row is more than last sent bookmark).

For example, a Delete Enumeration can include:

```
SELECT dt.* FROM
    (select dt0.* from_sysOcsDeletedRows as dt0 where
    dt0._sysTN = '<User Table>' and -- DELETEs of a table
    dt0._sysInsertTxBsn < LBSN and -- Filter INSERT + DELETE
    dt0._sysDeleteTxBsn >= LBSN and dt0._sysDeleteTxBsn <
    EBSN) AS dt
LEFT OUTER JOIN
    (select txcs0.* from_sysTxCommitSequence as txcs0 where
    txcs0._sysTxCsn >= LCSN and txcs0._sysTxCsn < ECSN) AS
    txcs
    ON dt._sysDeleteTxBsn = txcs._sysTxBsn OR
    txcs._sysTxBsn IS NULL;
```

Such an arrangement enables modification of the index only once per table per transaction. Accordingly, Data Manipulation Language (DML) is in general not affected. Such can include mitigating problems associated with time stamping wherein INSERT requires at least two page scans, (e.g., when a row is added to a user table and a new timestamp is assigned to it, and because the timestamp column has an index, a new index entry is added; likewise, a conventional UPDATE requires at least two page scans, when a row is updated in a user table, a new timestamp is assigned to it—and because the timestamp column has an index, the index entry is updated.) Moreover, the subject innovation mitigates problems associated with conventional architectures that fail to support batching—wherein all the changes since last sync are marked with a single generation number.

Figure 4:
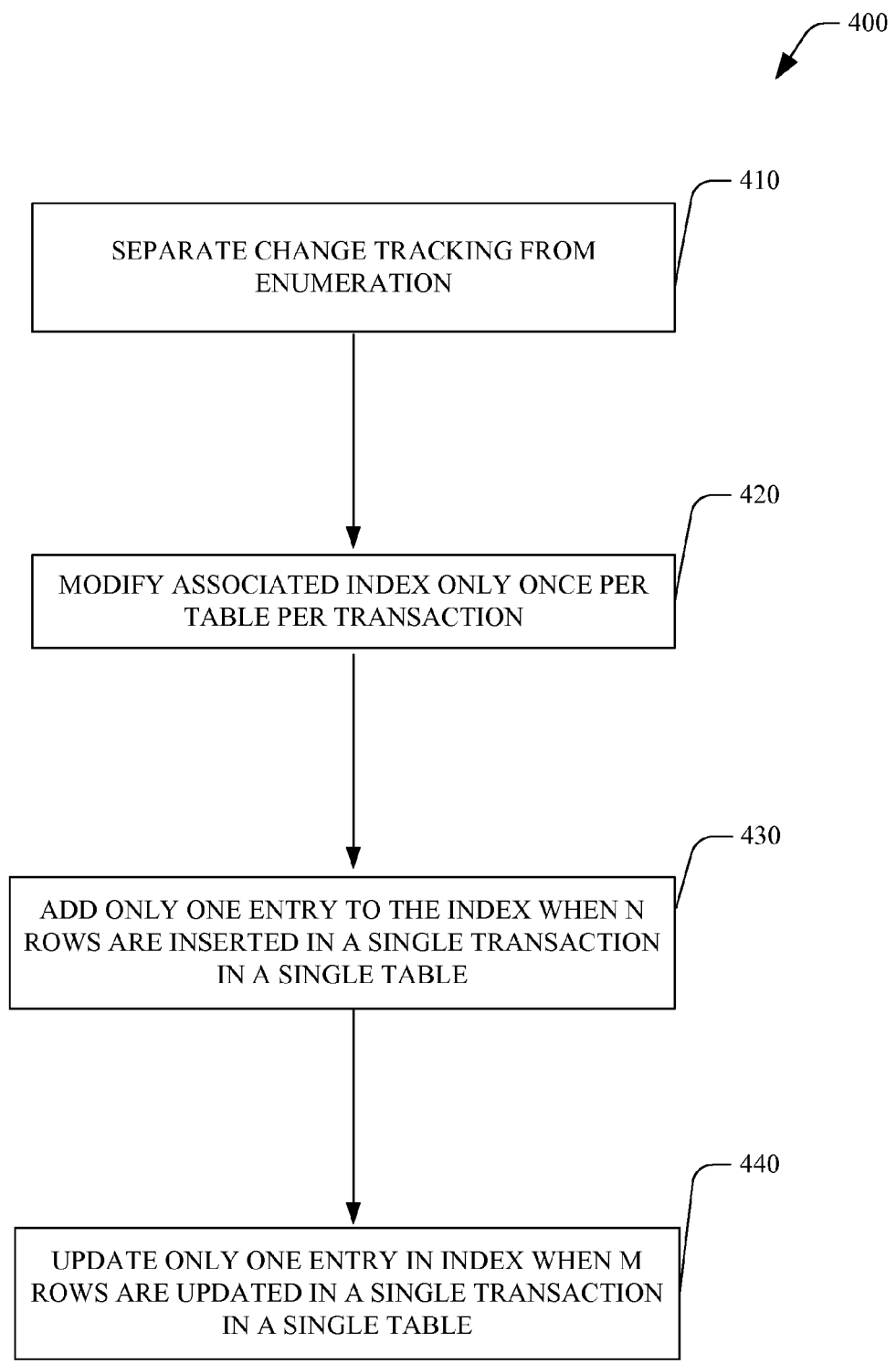
FIG. 4 illustrates a related methodology of change tracking in accordance with an aspect of the subject innovation.

FIG. 4 illustrates a related methodology 400 of change tracking in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410, change tracking can be separated from enumeration, wherein such separation enables changes to be consumed at different rates as required by users and a slow Sync operation will typically not affect normal database operation (e.g., inserting, updating, deleting data). Next and at 420, an associated index can be handled (e.g., modified) only once per table per transaction. Subsequently and at 430, when N rows are inserted (where N is an integer) in a single transaction in a single table, typically only one entry is added to the index. Likewise, and at 440 when M rows are updated in a single transaction (where M is an integer) in a single table, typically only one entry in index is updated and/or added.

Figure 5:
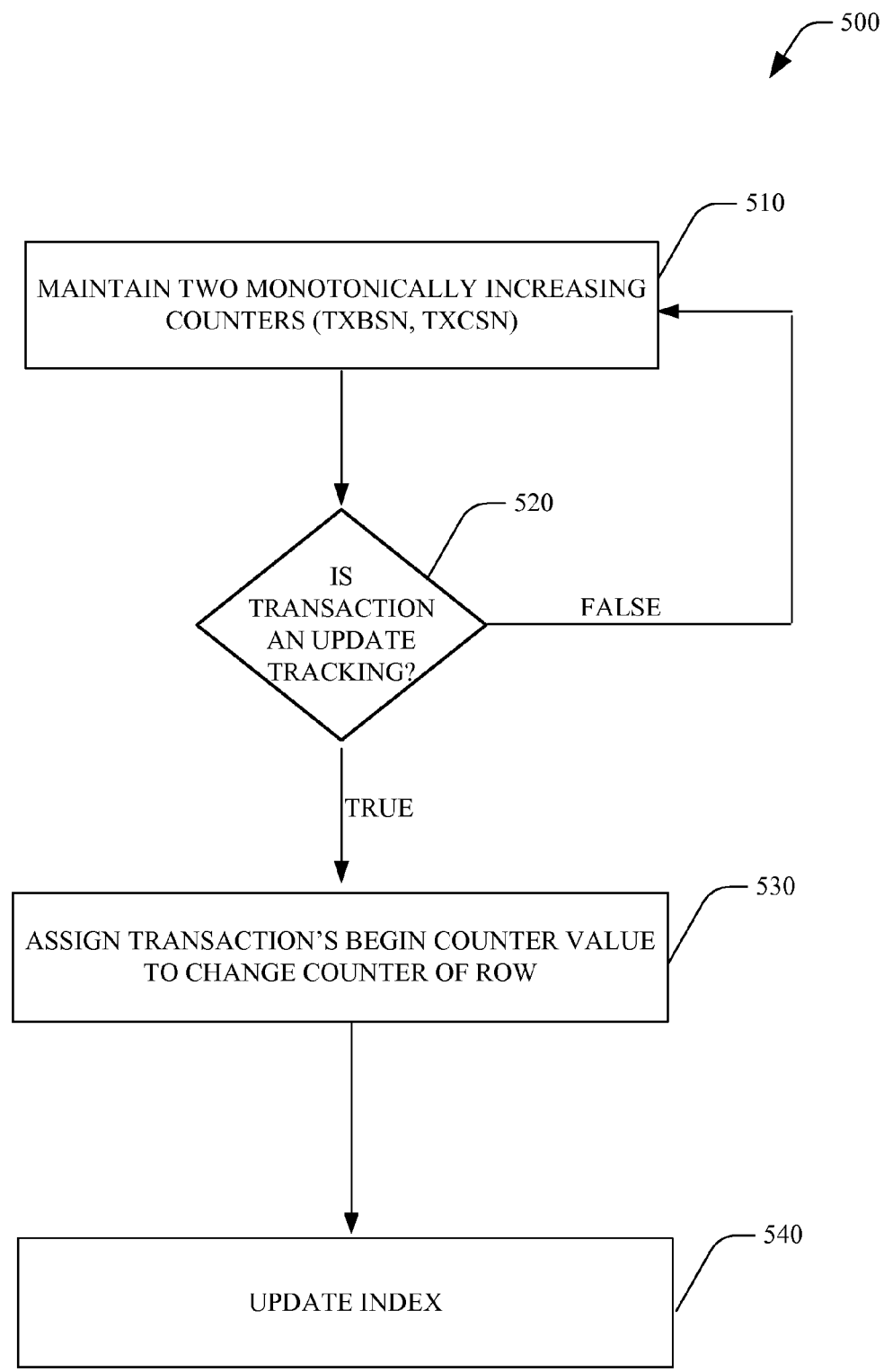
FIG. 5 illustrates a related methodology of update tracking according to a particular aspect of the subject innovation.

FIG. 5 illustrates a related methodology 500 of update tracking according to a particular aspect of the subject innovation. Initially and at 510 two monotonically increasing counters, namely: begin counter and transaction commit counter. Next, and at 520 verification is performed as to whether such transaction is an update tracking operation. If so, and at 530 the transaction's begin counter value is assigned to change counter of row. Otherwise, the methodology returns to act 510. At 540, the index can be updated in accordance with an exemplary aspect of the subject innovation.

Figure 6:
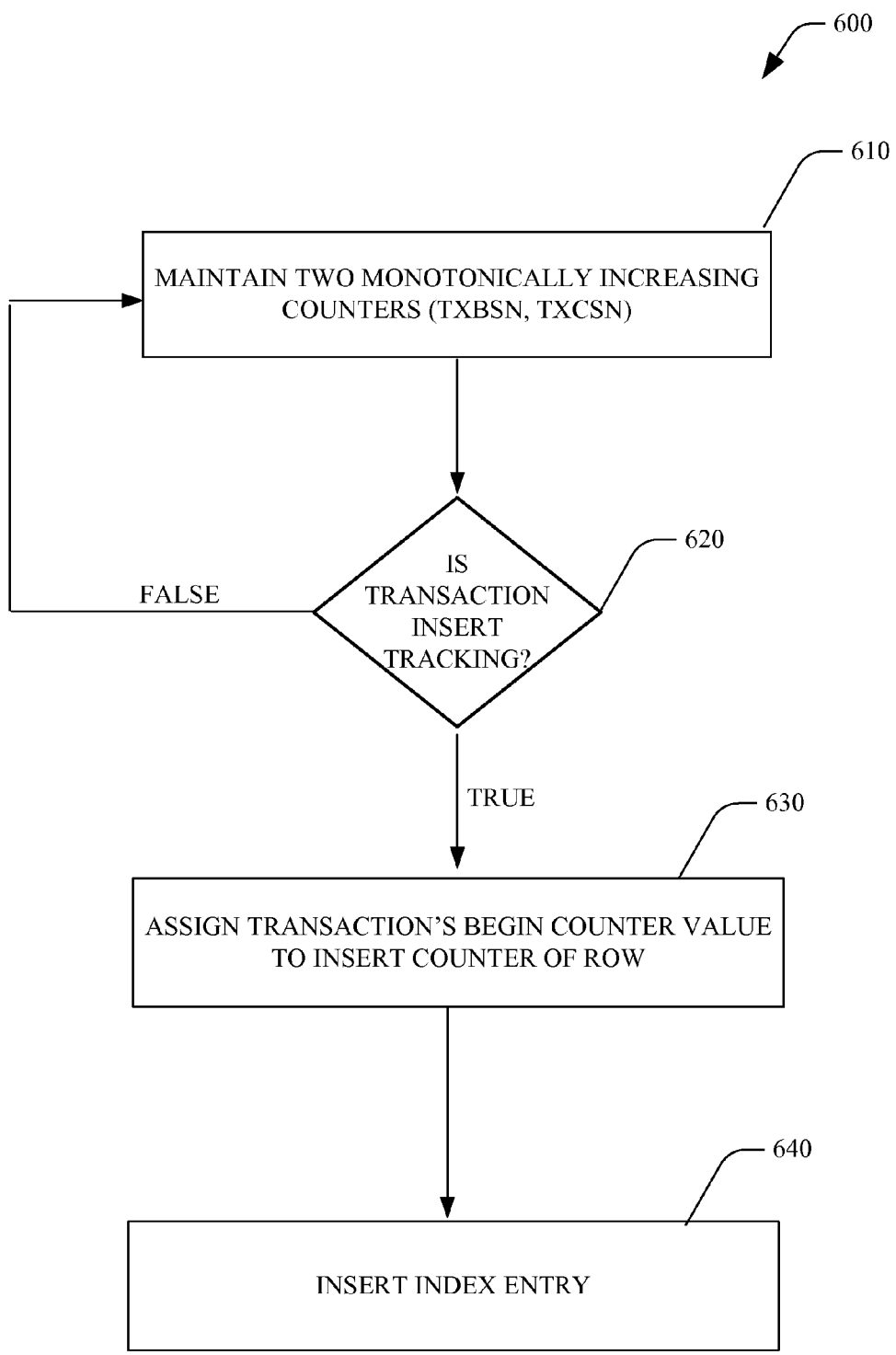
FIG. 6 illustrates a related methodology of insert tracking according to a particular aspect of the subject innovation.

FIG. 6 illustrates a related methodology 600 of insert tracking according to a particular aspect of the subject innovation. Initially and at 610 two monotonically increasing counters, namely: begin counter and transaction commit counter. Next, and at 620 a verification is performed as to whether such transaction is an insert tracking operation. If so, and at 630 the transaction's begin counter value is assigned to insert counter of the row. Otherwise, the methodology returns to act 610. At 640, the index entry can be inserted in accordance with an exemplary aspect of the subject innovation.

Figure 7:
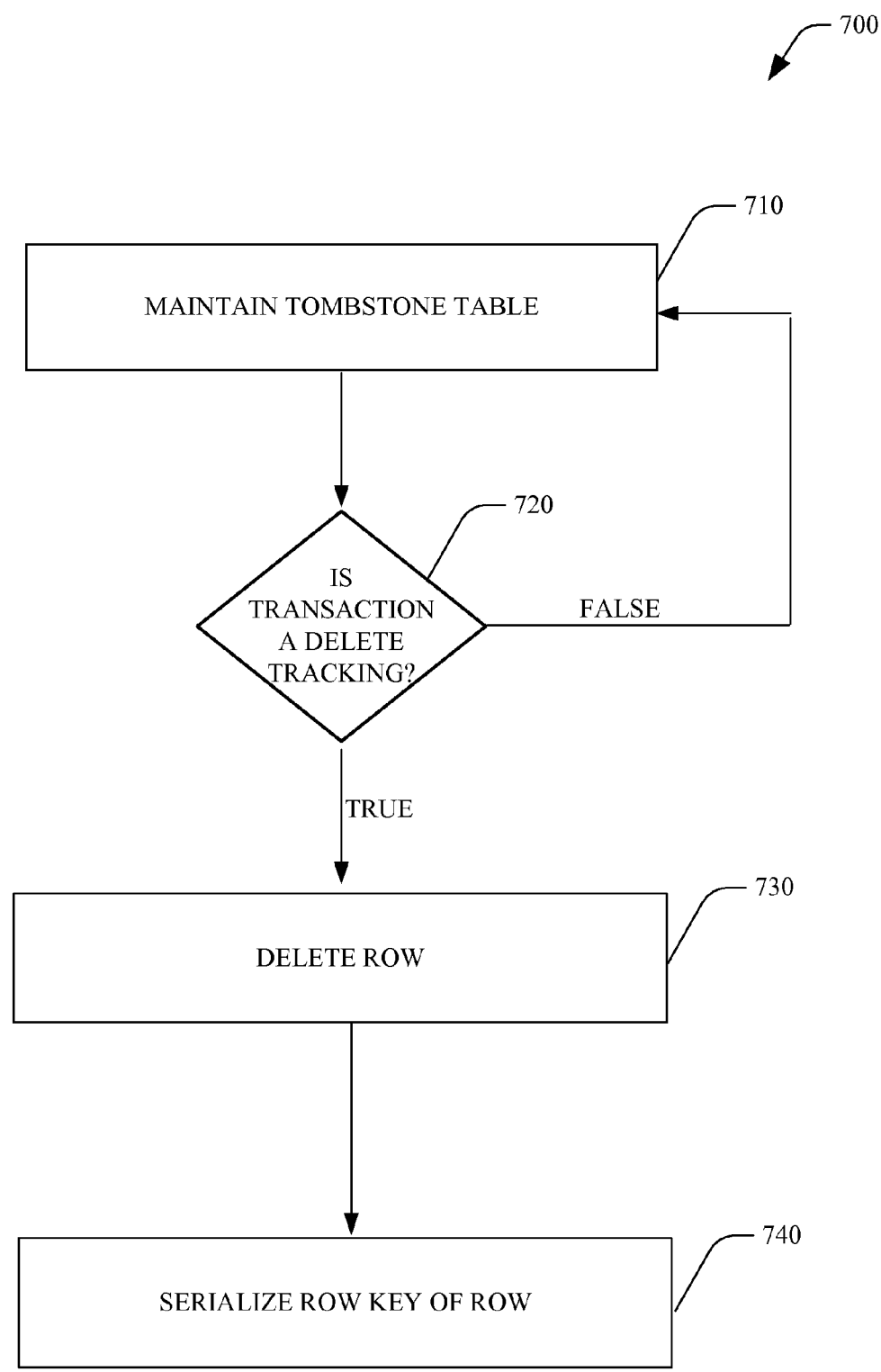
FIG. 7 illustrates a methodology of delete tracking in accordance with an aspect of the subject innovation.

FIG. 7 illustrates a related methodology 700 of delete tracking in accordance with an aspect of the subject innovation. Initially, and at 710 a tombstone table can be maintained, wherein such table typically includes schema such as <Table Name, Serialized row key, Delete Counter, Insert Counter of the deleted row>. Next, and at 720 a verification is performed as to whether such transaction is a delete tracking operation.

If so, and at 730 a row can be deleted, and at 740 the methodology 700 serializes the row key of the row, and adds a row such as [Table Name, Serialized Row Key, Deleting transaction's begin counter value, insert counter value of deleted row] to the tombstone table.

Figure 8:
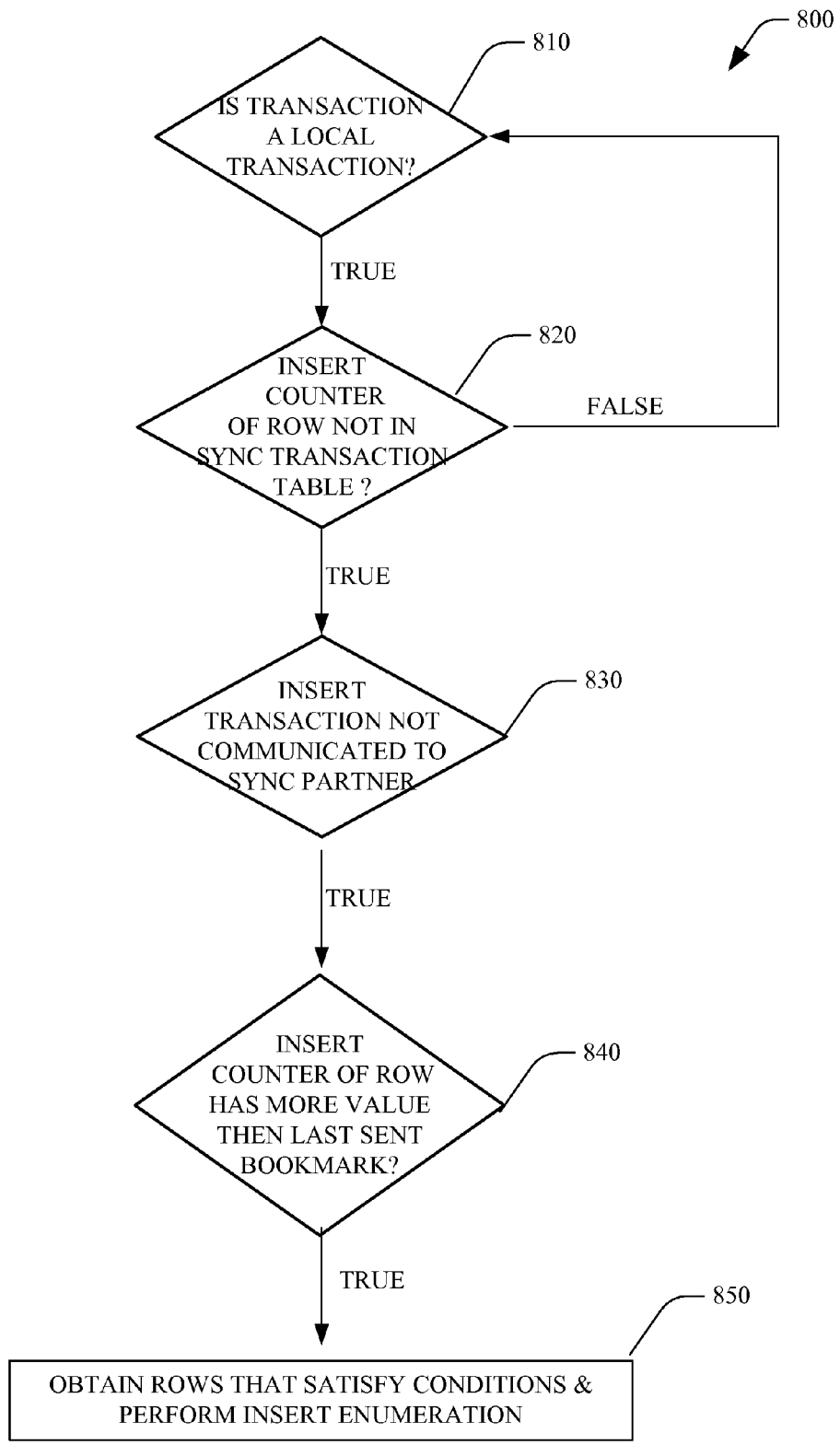
FIG. 8 illustrates a methodology of INSERT enumeration in accordance with an aspect of the subject innovation.

Likewise, for change enumeration and synchronization, the subject innovation can maintain bookmarks, wherein such bookmarks can point to changes that have been communicated to the sync partner tracking. The values of transaction begin counter (last sync begin counter) and transaction commit counter (last sync commit counter) can be obtained at the time of enumerating the changes and storing in a table, upon acknowledgement by the sync partner. Such values can be maintained per table in a metadata table (namely _sysSyncArticles). For example, FIG. 8 illustrates a methodology 800 of insert enumeration in accordance with an aspect of the subject innovation. Initially and at 810, a determination is made as to whether the transaction is a local user transaction, and hence not an INSERT received from sync partner. If true, next and 820 a determination is made as to whether Insert counter of the row is not in sync transaction table. If so, and at 830 a determination is made as to whether such INSERT transaction is not already communicated to the Sync partner. If true, and at 840 a determination is made as to whether insert counter of the row has more value than the last sent bookmark. Next, and at 850 all rows that satisfy such conditions 810, 820, 830, 840 are obtained from the user table, and INSERT Enumeration performed.

Figure 9:
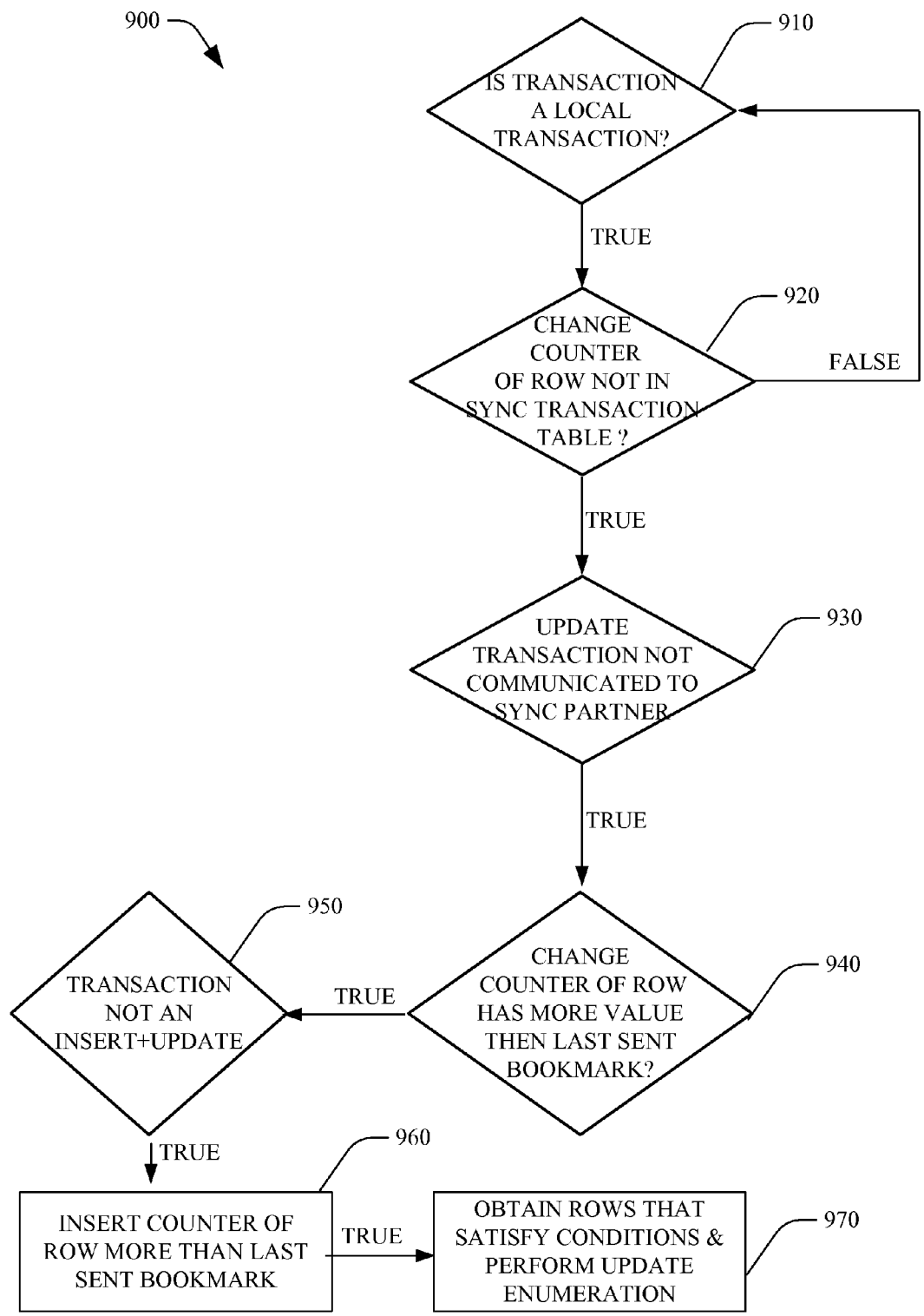
FIG. 9 illustrates a methodology of UPDATE enumeration in accordance with an aspect of the subject innovation.

FIG. 9 illustrates a methodology 900 of update enumeration in accordance with an aspect of the subject innovation. Initially and at 910, a determination is made as to whether the transaction is a local user transaction, and hence not an UPDATE received from sync partner. If true, next and 920 a determination is made as to whether change counter of the row is not in sync transaction table. If so, and at 930 a determination is made as to whether such UPDATE transaction is not already communicated to the Sync partner.

If true, and at 940 a determination is made as to whether change counter of the row has higher value than the last sent bookmark. Next, and at 950 a further determination is made as to whether the transaction is not an INSERT+UPDATE. Subsequently, and at 960 it is verified that insert counter of the row is more than last sent bookmark. At 970 all rows that satisfy such conditions 910, 920, 930, 940 are obtained from the user table, and UPDATE Enumeration performed.

Figure 10:
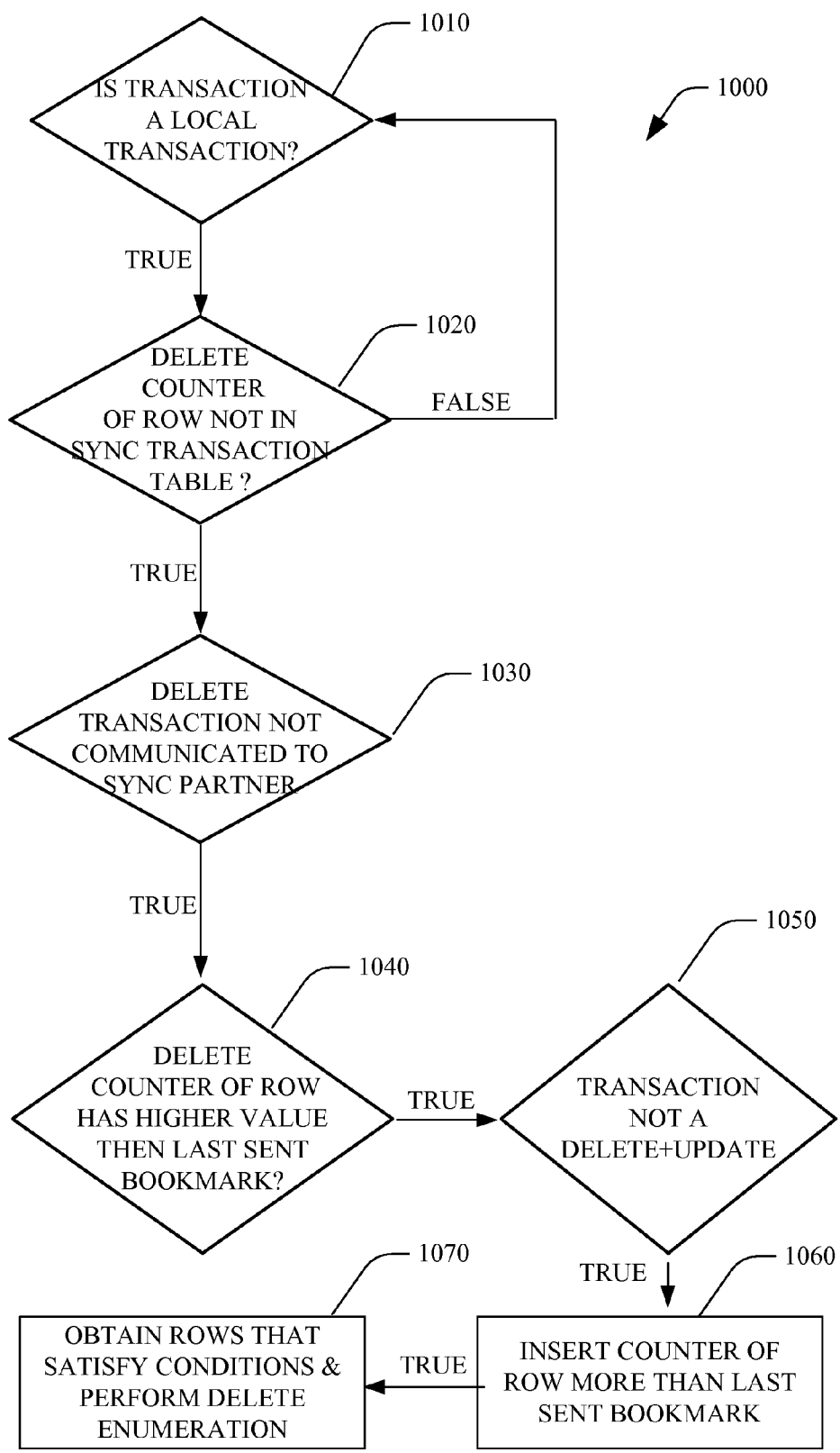
FIG. 10 illustrates a methodology of DELETE enumeration in accordance with an aspect of the subject innovation.

FIG. 10 illustrates a methodology 1000 of DELETE enumeration in accordance with an aspect of the subject innovation. Initially and at 1010, a determination is made as to whether the transaction is a local user DELETE transaction, and hence not a DELETE received from sync partner. If true, next and 1020 a determination is made as to whether Delete counter of the row is not in sync transaction table. If so, and at 1030 a determination is made as to whether such DELETE transaction is not already communicated to the Sync partner.

If true, and at 1040 a determination is made as to whether Delete counter of the row has higher value than the last sent bookmark. Next, and at 1050 a further determination is made as to whether the transaction is not an INSERT+DELETE. Next, and at 1060 it is verified that insert counter of the row is more than last sent bookmark. At 1070 all rows that satisfy such conditions 1010, 1020, 1030, 1040 are obtained from the user table, and DELETE Enumeration performed at 1060.

Hence, the changes made by the sync layers are separated from user transaction changes. For INSERT enumeration operation all rows from user table can be obtained that pertain to: a local user transaction insert (e.g., not an INSERT received from sync partner—Insert counter of the row is not in sync transaction table); and wherein such INSERT is not already communicated to the sync partner (e.g., Insert counter of the row has more value than the last sent bookmark).

Figure 11:
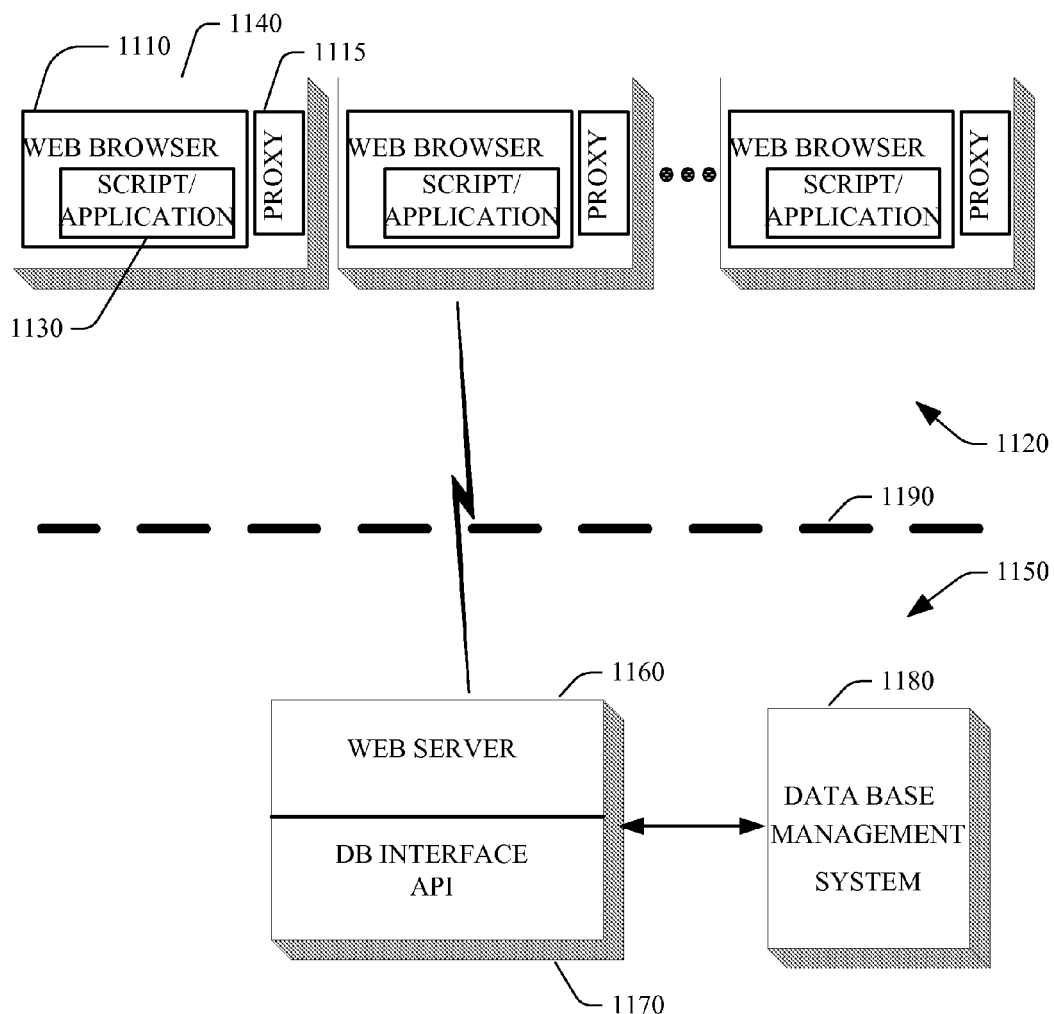
FIG. 11 illustrates a plurality of clients that request modification to a data base in accordance with an aspect of the subject innovation.

FIG. 11 illustrates a plurality of clients that request modification to a data base in accordance with an aspect of the subject innovation, wherein running on each of the client 1120 can be a client process, for example, a web browser 1110. Likewise, running on the server 1150 can be a corresponding server process, for example, a web server 1160. In addition, embedded in the Web Browser 1110 can be a script or application 1130, and running within the run-time environment 1140 of the client computer 1120, can exist a proxy 1115 for packaging and unpacking data packets formatted. Communicating with the server 1150 is a database management system (DBMS) 1180, which manages access to a database (not shown). The DBMS 1180 and the database (not shown) can be located in the server itself, or can be located remotely on a remote database server (not shown). Running on the Web server 1160 is a database interface Applications Programming Interface (API) 1170, which provides access to the DBMS 1180. The client computer 1120 and the server computer 1150 can communicate with each other through a network 1190. It is to be appreciated that other arrangements are also possible, for example the client computer and the server computer being the same computer. When the client process, e.g., the Web browser 1110, requests data from a database, the script or application 1130 issues a query, which is sent across the network (e.g. internet) 1190 to the server computer 1150, where it is interpreted by the server process, e.g., the Web server 1160. The client's 1120 request to server 1150 can contain multiple commands, and a response from server 1150 can return a plurality of result sets.

In such communication, session, presentation, and application service elements can be provided by Tabular Data Stream (TDS). Since TDS does not require any specific transport provider, it can be implemented over multiple transport protocols and the network 1190. Responses to client commands that are returned can be self-describing, and record oriented; (e.g., the data streams can describe names, types and optional descriptions of rows being returned.)

On the client side 1120 the data can be a Structured Query Language (SQL) command being in a language that the server side 1150 can accept, a SQL command followed by its associated binary data (e.g., the data for a bulk copy command), or an attention signal. When a connection is desired, the client 1120 can send a connection signal to the server. Even though the client 1120 can have more than one connection to the server 1150, each connection path can be established separately and in the same manner.

Once the server 1150 has received the connection signal from the client 1120 it will notify the client that it has either accepted or rejected the connection request. Likewise to send SQL command or batch of SQL commands; then the SQL command (e.g., represented by a Unicode format) can be copied into the data section of a buffer and then sent to the SQL Server side 1150.

To further illustrate various aspects of the present invention, the following example are provided for transactions $T_1$, $T_2$, $T_3$, $T_4$, $T_5$ that employ change enumeration with optimization. Typically, TXBSN and TXCSN are stored in the header page of the database, and accessing/Operating on such counters for every transaction can be readily performed since the header page is always resident in the memory and for every transaction commit, header page is flushed to disk because of page-level shadow copy.

According to an exemplary optimization for the subject innovation, an entry into _sysTxCommitSequence table is prohibited when the transaction commits in-order. Put differently, and entry is made when transaction commits out-of-order (that is TXBSN!=TXCSN). For example, when $T_1$, $T_2$, $T_3$, $T_4$, $T_5$ represent a Transaction Start Order, and a Transaction Commit Order is represented by $T_1$, $T_3$, $T_4$, $T_2$, $T_5$—then counter assignment are represented by Table 1 (assuming txsc and txcc start at 1, and since not all committed transactions make an entry into _sysTxCommitSequence table, one need to have two cases in WHERE conditions.)

TABLE 1

| Counter Name | Transaction | | | | |
| --- | --- | --- | --- | --- | --- |
| | T1 | T3 | T4 | T2 | T5 |
| TXBSN | 1 | 3 | 4 | 2 | 5 |
| TXCSN | 1 | 2 | 3 | 4 | 5 |
| INSERT into _sysTxCommitSequence | N | Y | Y | Y | N |

In addition, change information (e.g., at sub-entity levels) can be captured for efficient operation of entity synchronization and/or conflict detection. For example, If an INSERT results in constraint violation, a conflict exists.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
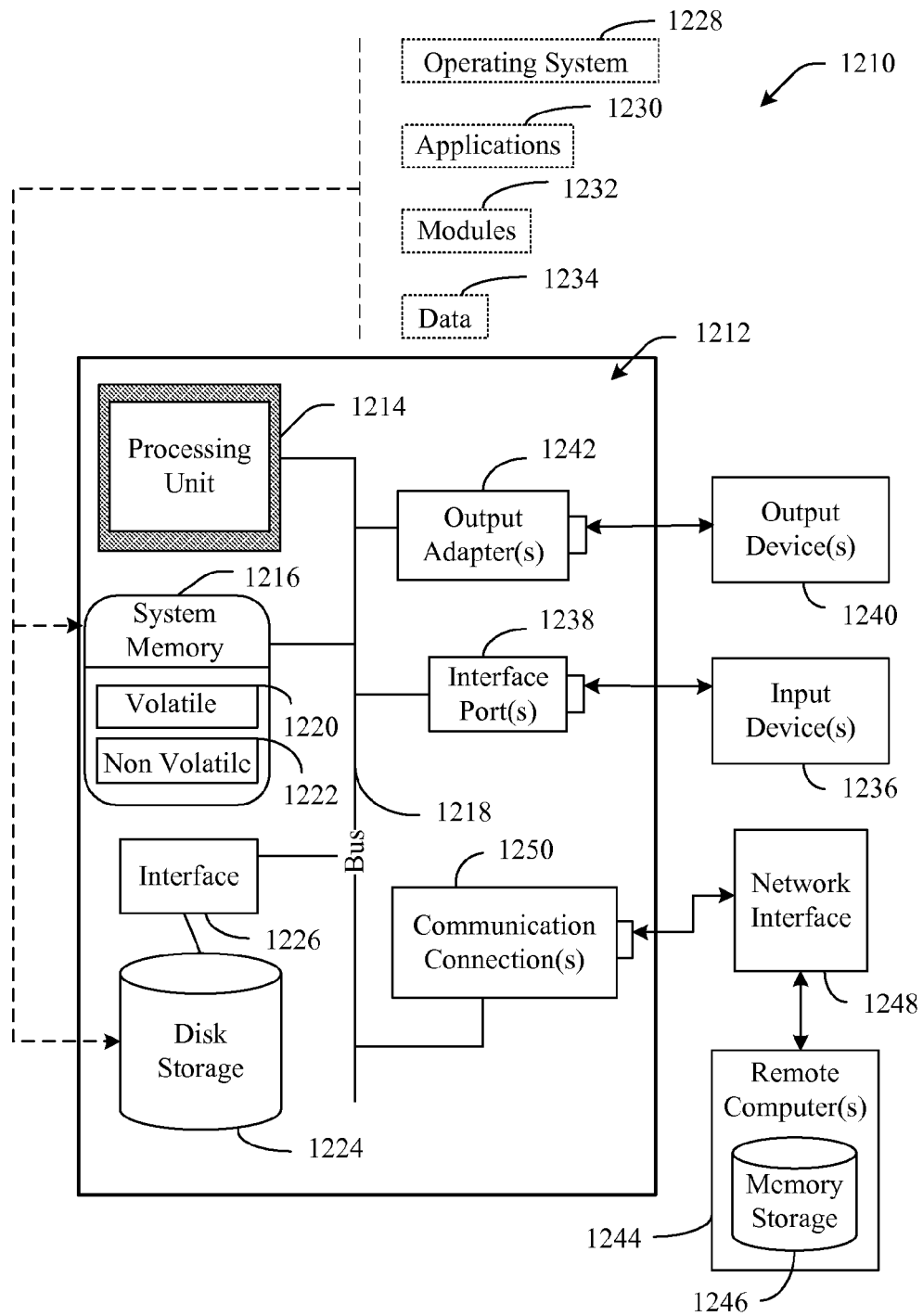
FIG. 12 illustrates an exemplary operating environment for implementing various aspects of the subject innovation.
Figure 13:
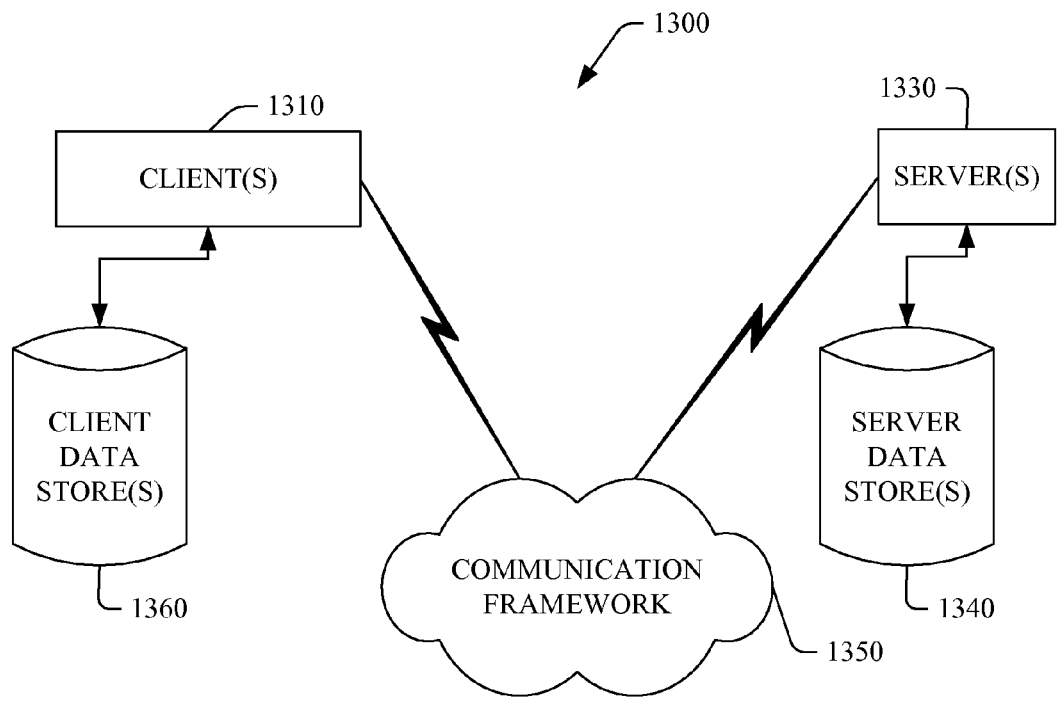
FIG. 13 illustrates a schematic block diagram of a sample computing environment with which the subject innovation can interact.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 12, an exemplary environment 1210 for implementing various aspects of the subject innovation is described that includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates a disk storage 1224, wherein such disk storage 1224 includes, but is not limited to, devices like a magnetic disk drive, floppy disk drive, tape drive, Jaz drive, Zip drive, LS-60 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that various components described herein can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 that can be employed in conjunction with changing a database in accordance with an aspect of the subject innovation. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the components described herein, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
 a memory;
 a database stored at the memory; and
 a processor coupled to the memory, the processor configured to:
  execute instructions retrieved from the memory that cause execution of a data change tracking layer configured to separate change tracking and change enumeration at the database and configured to maintain one or more table synchronization bookmarks associated with the database;
  execute instructions retrieved from the memory that cause execution of a transaction identifier configured to detect a transaction at the database and to create an entry corresponding to the transaction at each of the one or more table synchronization bookmarks; and update a single row of an index associated with a single data table of the database when the transaction is a multi-row transaction, wherein the multi-row transaction corresponds to database operations at the single data table of the database, wherein the multi-row transaction comprises at least one of inserting N rows into the single data table, deleting N rows from the single data table, and updating N rows at the single data table, wherein N comprises an integer greater than one;

wherein the data change tracking layer comprises a transaction begin counter that monotonically increases to uniquely identify transactions at the database and wherein the transaction begin counter is incremented by one to uniquely identify the multi-row transaction.

2. The system of claim 1, wherein the data change tracking layer comprises a transaction commit counter that is assigned to committing transactions at the database.

3. The system of claim 2, wherein the transaction begin counter and the transaction commit counter are stored at a metadata table associated with the database.

4. The system of claim 1, wherein the processor is further configured to execute a tombstone component to track DELETE transactions at the database.

5. The system of claim 1, further comprising a transaction commit sequence table that maps transaction begin counter values to transaction commit counter values.

6. The system of claim 1, wherein the processor is further configured to execute a bookmark component to indicate changes communicated to a synchronization partner of the database.

7. The system of claim 1, wherein the processor is further configured to execute instructions retrieved from the memory comprising instructions to maintain a table of synchronization transactions of the database.

8. A method comprising:
at a computer system comprising a processor and a memory, detecting a multi-row transaction at a database, wherein the database is associated with a plurality of synchronization entities, each particular synchronization entity operable to synchronize with the database via a synchronization bookmark assigned to the particular synchronization entity, wherein the multi-row transaction corresponds to database operations at a single data table of the database, wherein the multi-row transaction comprises at leas one of inserting N rows into the single data table, deleting N rows from the single data table, and updating N rows at the single data table, wherein N comprises an integer greater than one;
updating a single row of an index associated with the single data table of the database in response to the multi-row transaction;
incrementing a monotonically increasing transaction begin counter of the database by one to uniquely identify the multi-row transaction; and
creating an entry corresponding to the multi-row transaction at the synchronization bookmark for each of the plurality of synchronization entities.

9. The method of claim 8, wherein the plurality of synchronization entities includes a first synchronization entity associated with a first synchronization technology and a second synchronization entity associated with a second synchronization technology that is different from the first synchronization technology.

10. The method of claim 8, wherein the database operations include inserting a plurality of rows at the single table of the database.

11. The method of claim 8, further comprising maintaining a monotonically increasing transaction commit counter to track changes at the database.

12. The method of claim 8, further comprising serializing a row key when execution of the transaction deletes a row of a table of the database.

13. The method of claim 8, further comprising determining a transaction begin counter value and a transaction commit counter value prior to creating the entry corresponding to the multi-row transaction, wherein the entry corresponding to the multi-row transaction includes the transaction begin counter value and the transaction commit counter value.

14. The method of claim 8, further comprising identifying transactions that have been communicated to the particular synchronization entity.

15. The method of claim 14, further comprising identifying transactions that have not been communicated to the particular synchronization entity.

16. The method of claim 8, wherein at least one of the plurality of the synchronization entities is a synchronization partner of the database.

17. A computer-readable non-transitory storage medium comprising instructions, that when executed by a computer, cause the computer to:
detect a multi-row transaction at a database via change tracking logic, wherein the multi-row transaction corresponds to database operations at a single data table of the database;
assign a transaction identifier to the detected multi-row transaction via change enumeration logic that is separate from the change tracking logic;
increment a monotonically increasing transaction begin counter of the database by one to uniquely identify the multi-row transaction;
update a single row of an index associated with the single data table of the database in response to the multi-row transaction, wherein the multi-row transaction comprises at least one of inserting N rows into the single data table, deleting N rows from the single data table, and updating N rows at the single data table, wherein N comprises an integer greater than one; and
create an entry corresponding to the multi-row transaction at a first synchronization bookmark associated with a first synchronization entity of the database and at a second synchronization bookmark associated with a second synchronization entity of the database, wherein the entry includes the transaction identifier.

18. The computer-readable non-transitory storage medium of claim 17, wherein executing the multi-row transaction comprises modifying elements in one or more columns in each of two or more rows of the single data table.

19. The computer-readable non-transitory storage medium of claim 17, wherein the index is associated with a timestamp column of the single data table.

* * * * *